United States Patent [19]

Gioutsos et al.

[11] Patent Number: 5,400,487
[45] Date of Patent: Mar. 28, 1995

[54] VARIABLE INFLATION SYSTEM FOR VEHICLE SAFETY RESTRAINT

[75] Inventors: Tony Gioutsos, Brighton; Edward J. Gillis, Canton; Leonard W. Behr, White Lake, all of Mich.

[73] Assignee: Automotive Systems Laboratory, Inc., Farmington Hills, Mich.

[21] Appl. No.: 182,281

[22] Filed: Jan. 14, 1994

[51] Int. Cl.6 .................................. B60R 21/26
[52] U.S. Cl. .......................... 280/735; 280/736; 180/282
[58] Field of Search ........... 280/735, 734, 736, 728 R; 180/282

[56] References Cited

U.S. PATENT DOCUMENTS

| | | | |
|---|---|---|---|
| 4,021,057 | 5/1977 | Held et al. | 280/735 |
| 4,243,248 | 1/1981 | Scholz et al. | 280/735 |
| 5,067,744 | 11/1991 | Hirabayashi | 280/734 |
| 5,071,160 | 12/1991 | White et al. | 280/735 |
| 5,074,583 | 12/1991 | Fujita et al. | 280/735 |
| 5,209,510 | 5/1993 | Mamiya | 280/735 |
| 5,232,243 | 8/1993 | Blackburn et al. | 280/735 |
| 5,320,382 | 6/1994 | Goldstein et al. | 280/735 |

FOREIGN PATENT DOCUMENTS

| | | | |
|---|---|---|---|
| 3809074 | 10/1989 | Germany | 280/728 R |
| 5116589 | 5/1993 | Japan | 280/734 |

*Primary Examiner*—Margaret A. Focarino
*Assistant Examiner*—Peter C. English
*Attorney, Agent, or Firm*—Lyman R. Lyon

[57] ABSTRACT

An inflation system (10) for a gas-operated vehicle occupant safety restraint, such as an air bag (12), comprises an accelerometer (14) and an infrared transceiver (20) for receiving vehicle acceleration information (a) and occupant position information (x), respectively, for use by a processor (22) in selecting which of a plurality of gas generators (28) will be individually initiated, at selected actual times to fire, in a selected order, to provide optimal protection to the occupant in the event of a vehicle crash or marked vehicle deceleration.

10 Claims, 2 Drawing Sheets

VARIABLE INFLATION SYSTEM FOR VEHICLE SAFETY RESTRAINT

BACKGROUND OF THE INVENTION

The instant invention relates to systems for deploying gas-operated vehicle occupant safety restraints, such as vehicle air bags, which seek to optimize occupant protection notwithstanding variations in occupant size and/or position within the vehicle at the time at which safety restraint deployment is otherwise deemed advisable.

The prior art teaches inflation systems for deploying an air bag in a motor vehicle which typically include a single gas generator in fluid communication with the interior of the uninflated air bag. In the typical embodiment, the gas generator is triggered by an air bag firing circuit when the sensed vehicle acceleration exceeds a predetermined threshold value, as through the use of an acceleration-responsive inertial switch and an explosive "squib."

In a variation upon this design, U.S. Pat. No. 4,928,991 to Thorn teaches an aspirating inflator assembly for a vehicle occupant restraint which employs a plurality of low cost gas generators to achieve an increased aspiration ratio. Each of Thorn's identical gas generators has an identical output characteristic, i.e., generate a like quantity of gas effluent over a like amount of time; and the basic manner in which each gas generator is triggered remains the same, i.e., a "fire" signal for each gas generator is itself generated when the sensed acceleration exceeds a predetermined threshold value, thereby identifying the time at which each gas generator is to be triggered (sometimes referred to as its "actual time-to-fire" or "actual TTF"). Thorn further suggests that the use of multiple gas generators permits the adapting of the inflator assembly output characteristic to the conditions of the crash, i.e., vehicle velocity, ambient temperature, occupant size and/or position or other condition, presumably based upon values therefor as measured at the time that the "fire" signal is generated, by triggering the ignition of only some of the inflator assembly's multiple gas generators. Stated another way, under Thorn, a fire signal is generated by the firing circuit based solely upon received vehicle acceleration information, at which time the initiation of each gas generator is selectively triggered to provide a plurality of inflator responses.

In U.S. Pat. No. 5,074,583, Fujita et al teach an air bag system for an automobile which employs acceleration data to detect a vehicle collision or marked deceleration requiring deployment of the air bag. The system further controls when and how quickly to inflate the air bag upon such detection of a vehicle collision or marked deceleration based on occupant position as it is indirectly garnered from the occupant's "seating condition," i.e., the longitudinal position of the seat within the vehicle, the reclining angle of the seat back, pressure sensors in the seat and seat back, etc. Thus, as under the above Thorn patent, under Fujita et al, once a "fire" signal is generated by the system's firing circuit, the system attempts to further adjust the nature of the response, i.e., the manner in which the air bag is actually inflated, in response to indirectly-sensed occupant position data. There is no attempt to adjust the actual TTF, i.e., the time at which the "fire" signal is itself generated, based on the nature or severity of the crash experienced by the vehicle. Nor do Fujita et al attempt to further correlate or otherwise qualify system response with the nature or severity of the crash and, hence, system response under Fujita et al fails to differentiate, for example, between a short-period, high-velocity crash and a long-period, low velocity crash (each of which requires substantively different inflator response, notwithstanding an identical relative occupant position within the vehicle).

SUMMARY OF THE INVENTION

It is an object of the instant invention to provide an inflation system for a gas-operated vehicle occupant safety restraint, such as an air bag, which adapts the manner in which the restraint is inflated so as to maximize its effectiveness for an occupant in any given position within the vehicle and for any given crash type.

A further object of the instant invention is to provide an inflation system for a gas-operated vehicle occupant safety restraint, such as an air bag, which employs a selected one of a plurality of inflation profiles as determined by an occupant's relative position within the vehicle and the nature or type of the crash thereinvolved, with each inflation profile featuring a different bag inflation rate and/or inflation pressure, whereby air bag inflation may be tailored to maximize restraint effectiveness.

In accordance with the instant invention, an inflation system for a gas-operated vehicle occupant safety restraint, such as an air bag, comprises a first means for receiving information representative of instantaneous vehicle acceleration; a second means for receiving information indicative of instantaneous occupant position relative to a fixed interior structure; and a processor means, responsive to the received vehicle acceleration information and the received occupant position information, for determining a first measure representative of crash type using the received vehicle acceleration information, and for determining a desired inflation profile using the first measure representative of crash type and the received occupant position information. In accordance with the instant invention, while the processor means determines the first measure and, correlatively, the desired inflation profile, the processor means is simultaneously determining a first actual time to fire using the received vehicle acceleration information. Finally, the instant system further includes actuating means, responsive to the first time to fire and the desired inflation profile, for generating a gas effluent in accordance with the desired inflation profile at the first time to fire. In the preferred embodiment, the actuating means comprises an inflator assembly having at least two individually-triggerable gas generators, wherein one of the gas generators has a different output characteristic than another of the gas generators.

In operation, the instant system receives information as to vehicle acceleration and occupant position and, upon discriminating a crash condition requiring deployment of a safety restraint while otherwise determining the probable crash-type, the system selectively triggers individual gas generators to tailor the inflation profile to meet those conditions.

DETAILED DESCRIPTION OF THE PREFERRED EMBODIMENT(S)

Figure 1:
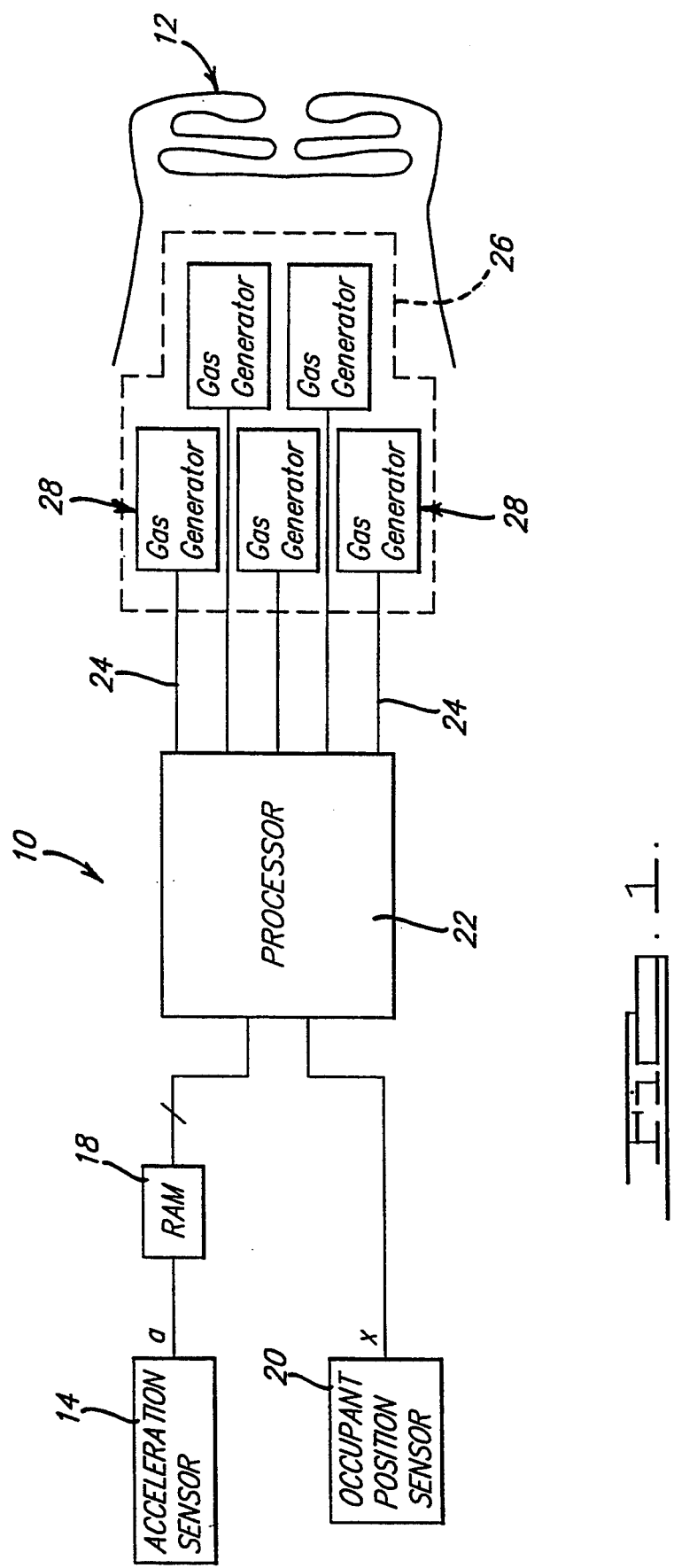
FIG. 1 is a block diagram of the instant variable inflation system for inflating a vehicle air bag.

Referring to FIG. 1, an inflation system 10 for a gas-operated vehicle occupant safety restraint, such as an air bag 12, comprises a first means, such as an accelerometer 14, for receiving information a representative of instantaneous vehicle acceleration, which acceleration information is supplied as digital acceleration data 16 to a data storage means, such as a RAM 18; a second means, such as infrared transceiver 20, for receiving information x indicative of instantaneous occupant position; processor means 22 responsive to the acceleration data 16 stored in the RAM 18 and the instantaneous occupant position information for generating at least one trigger signal 24 based on the acceleration data 16 and the instantaneous occupant position information; and actuating means, such as air bag inflator 26, responsive to the at least one trigger signal 24 for deploying the safety restraint 12, wherein the inflator 26 includes at least two individually-triggerable gas generators 28 responsive to the at least one trigger signal 24 generated by the processor means 22, respectively, with at least one of the gas generators 28 having a different output characteristic than the other gas generators 28.

Under the instant invention, the output characteristic of the inflator 26 as a whole—its "inflation profile"—is defined by the timing of and particular order in which each of its gas generators 28 is selectively triggered by the processor 22, which itself is a function of both the crash type (as extrapolated from past received acceleration data) and the occupant position (as indicated by present received occupant position data).

Figure 2A:
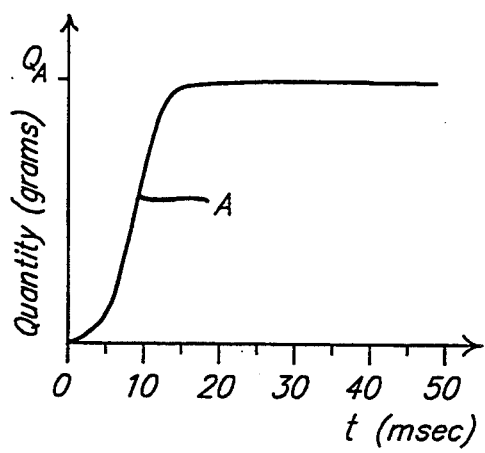
FIGS. 2a and 2b are plots of the total quantity of gas generated over time by a first gas generator (A) and a second gas generator (B) controlled by the instant system, respectively, as measured from the time of their ignition.
Figure 2B:
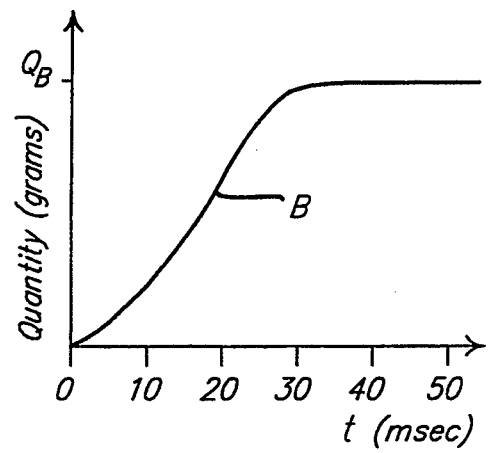

The Table below comprises a matrix providing exemplary values for the preferred actual times to fire $TTF_A$ and $TTF_B$ for each of two dissimilar gas generators A and B whose hypothetical outputs are plotted in FIGS. 2a and 2b, respectively. The output characteristic for gas generator A, i.e., the quantity of gas effluent generated by gas generator A over time, provides for a relatively rapid and, hence, relatively "hard" inflation of the air bag 12; whereas the output characteristic of gas generator B provides for a relatively slower and, hence, relatively "softer" air bag inflation.

For the purpose of discussing the contents of the Table, it will be assumed that there are only these two gas generators A and B in the subject inflator; and that the actual times to fire appearing in the Table will provide the optimal inflation profile for a given combination of crash type and occupant position, for a given vehicle. The crash types appearing in the Table are nominally defined as follows: a small ON-condition crash is one generating an impact velocity of 15 MPH; a moderate ON-condition crash is one generating an impact velocity of 20 MPH; and a severe ON-condition crash is one generating an impact velocity of perhaps 25 MPH.

|  | Small ON-Condition Crash | Moderate ON-Condition Crash | Severe ON-Condition Crash |
| --- | --- | --- | --- |
| Near Occupant Position | $TTF_A$ = 45 msec | $TTF_A$ = 20 msec | $TTF_A$ = 10 msec |
|  | $TTF_B$ = 30 msec | $TTF_B$ = 25 msec | $TTF_B$ = 10 msec |
| Nominal Occupant Position | $TTF_A$ = 50 msec | $TTF_A$ = 30 msec | $TTF_A$ = 15 msec |
|  | $TTF_B$ = 40 msec | $TTF_B$ = 30 msec | $TTF_B$ = 20 msec |
| Far Occupant Position | $TTF_A$ = 60 msec | $TTF_A$ = 40 msec | $TTF_A$ = 20 msec |
|  | $TTF_B$ = 55 msec | $TTF_B$ = 35 msec | $TTF_B$ = 30 msec |

It must be emphasized the above Table provides preferred actual times to fire for each of the two gas generators thereinvolved, for purposes of illustration only.

Conceptually speaking, to obtain the desired inflation profile using the values in the Table, the ignition of each gas generator could be triggered by the crash discriminator at the actual time to fire prescribed therein. Under the more practical approach employed in the preferred embodiment of the instant system 10, however, the processor 22 determines a single actual time to fire upon application of its crash discrimination analysis to the received vehicle acceleration information a (as perhaps further supplemented using the received occupant position information x), whereupon the processor 22 checks the currently selected inflation profile to determine which of the gas generators 28 is then designated as properly being the first of the gas generators 28 to be ignited (noting further that the optimal inflation profile may designate two or more gas generators 28 as properly being the first gas generator 28 to be ignited, i.e., the inflation profile designates simultaneous ignition of those two or more gas generators 28). The processor 22 then proceeds to trigger ignition of the heretofore-designated-first-to-be-ignited gas generator 28. Thereafter, additional gas generators 28 are individually and selectively ignited after a time delay equal to the difference between the additional gas generators' prescribed actual time to fire less the first-to-be-ignited gas generator's prescribed actual time to fire, thereby effectuating the optimal inflation profile. It is noted that the approach of the preferred embodiment is particularly well-suited for systems employing a large number of gas generators 28 and, hence, which provide an even greater number of combinations and permutations in accordance with which the individual gas generators 28 may be ignited. In this manner, the response of the inflator 26 is adjusted to provide a selected one of the available inflation profiles available by virtue of the various combinations and permutations of individually triggering the gas generators at same or different TTFs.

Figure 3:
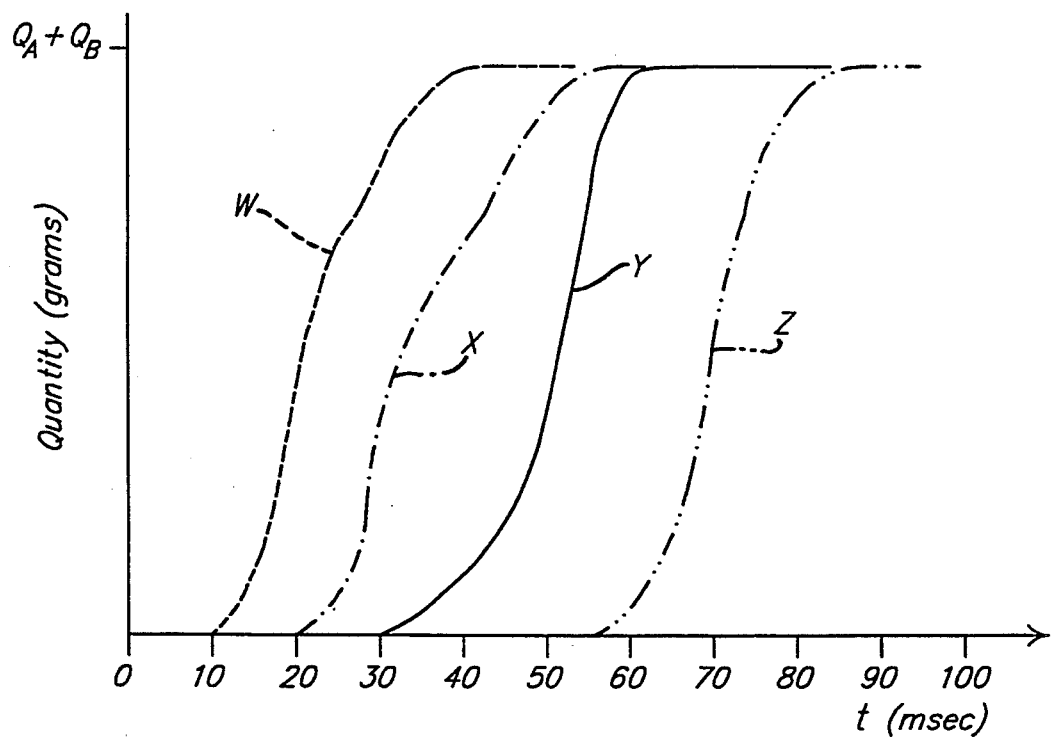
FIG. 3 contains exemplary plots of the total quantity of gas generated over time by the instant system under four different inflation profiles (W, X, Y and Z), as selected using measures representing crash-type and occupant position from four different scenarios, as measured from the commencement of a crash event.

FIG. 3 contains exemplary plots of the total quantity of gas generated over time by the instant system under four of the different inflation profiles found in Table. Specifically, where analysis of the received acceleration information prior to generation of the trigger signal further indicates the occurrence of a relatively severe crash, while the received occupant position information indicates an assumed position relatively near to the inflator as of the moment when the trigger signal is generated, the instant system determines the appropriate inflation profile W as requiring simultaneous ignition of both individual gas generators at a prescribed actual TTF of 10 msec so as to provide a very steep inflation profile or "S-curve" to inflate the air bag very rapidly.

And, where analysis of the received acceleration information prior to generation of the trigger signal further suggests that the vehicle is experiencing a relatively moderate crash, while the received occupant position information indicates that the occupant has assumed a position within the vehicle very near the restraint, the instant system would provide an inflation profile X featuring a hybrid S-curve having a gradual slope up followed by a steep rise in pressure over time, i.e., a relatively "soft" initial inflation followed by a relatively "harder" one. Specifically, this inflation profile X would be achieved by triggering ignition of gas generator A at an actual time to fire of 20 msec, with gas generator B being subsequently ignited after a further delay of 5 msec.

Where analysis of the received acceleration information prior to generation of the trigger signal suggests that the vehicle is experiencing a relatively small but significant crash, and the occupant is detected as being relatively near the uninflated air bag, gas generator B would first be ignited at an actual time to fire $TTF_B$ of 30 msec, with gas generator A being ignited some 15 msec later, illustrated as inflation profile Y in FIG. 3.

And, where analysis of the received acceleration information suggests that the vehicle is experiencing a relatively small but significant crash, but the occupant is detected as being relatively far away from the uninflated air bag, gas generator B would first be ignited at an actual time to fire $TTF_a$ of 55 msec, with gas generator A being ignited some 5 msec later, illustrated as inflation profile Z in FIG. 3.

As a final example (not shown in FIG. 3), where analysis of the received acceleration information a prior to the discrimination of a crash condition requiring deployment of the air bag suggests that the vehicle is experiencing a severe crash, but the received occupant position information x indicates an assumed position which is particularly far-removed from the uninflated air bag, the instant system would provide an inflation profile featuring a hybrid S-curve having a gradual slope up followed by a steep rise in pressure over time, i.e., a relatively "soft" initial inflation followed by a relatively "harder" one.

As a final note regarding to the Table, it should be pointed out that a truly "robust" system would not resort to a lookup table to obtain the actual TTFs corresponding to a given inflator profile but, rather, would be monotonic in its approach. Thus, where a delta velocity crash of 20 MPH is encountered (nominally a "moderate ON-condition crash") while an occupant is positioned 10 inches from the dash (a "near occupant position"), the Table supplies actual times to fire of 20 msec and 25 msec for gas generators A and B, respectively. Now suppose the occupant is seated at the same position, but a 22 MPH crash is encountered. The system should preferably prescribe an actual time to fire of 18 msec for gas generator inflator A and 21 msec for gas generator B.

Finally, it is noted that crash type and transitory occupant position remain significant measures even after the processor 22 triggers ignition of the first of the gas generators at the actual time to fire generated by the crash discrimination analysis. Accordingly, such subsequent crash type and transitory occupant position measures may thereafter be analyzed and the optimal inflation profile subsequently adjusted (as by shortening or lengthening the then-prescribed time delays relating to further ignition of the remaining gas generators 28), thereby further improving the response of the instant system 10.

While the preferred embodiment of the invention has been disclosed, it should be appreciated that the invention is susceptible of modification without departing from the spirit of the invention or the scope of the subjoined claims. For example, while the preferred embodiment discussed hereinabove relates to the deployment of an air bag, it will be readily appreciated that the invention may be used with other gas-operated safety restraints, e.g., seat belt pretensioners, which may be adapted to employ multiple gas generators to provide variable and/or multistage response.

We claim:

1. A system for generating a gas effluent for inflating a gas-operated vehicle occupant safety restraint comprising:
   a first means for receiving information representative of instantaneous vehicle acceleration;
   a second means for receiving information indicative of instantaneous occupant position relative to a fixed structure within the vehicle;
   a processor means, responsive to the received vehicle acceleration information and the received occupant position information, for determining a first measure representative of crash type using the received vehicle acceleration information, wherein said processor means further determines a desired inflation profile using the first measure representative of crash type and the received occupant position information, and wherein said processor means simultaneously determines a first actual time to fire using the received vehicle acceleration information; and
   actuating means, responsive to the first time to fire and the desired inflation profile, for generating a gas effluent in accordance with the desired inflation profile at the first time to fire.

2. The system of claim 1, wherein said actuating means includes an inflator assembly having at least two individually-triggerable gas generators, wherein one of the gas generators has a different output characteristic than another of the gas generators, and wherein the desired inflation profile selects which of said at least two gas generators is triggered at the first time to fire.

3. The system of claim 2, wherein said inflation profile further selects which of said at least two gas generators is triggered after the first time to fire at a second time to fire.

4. The system of claim 3, wherein the second time to fire is defined by the desired inflation profile relative to the first time to fire, whereby the second time to fire is a selected time delay after the first time to fire.

5. The system of claim 4, including means responsive to the received vehicle acceleration information or the received occupant position information for adjusting, after the first time to fire, the selected time delay.

6. The system of claim 1, wherein said processor means is further responsive to the received occupant position information when determining the first time to fire using the received vehicle acceleration information.

7. The system of claim 6, wherein said actuating means includes an inflator assembly having at least two individually-triggerable gas generators, wherein one of the gas generators has a different output characteristic than another of the gas generators, and wherein the desired inflation profile selects which of said at least two gas generators is triggered at the first time to fire.

8. The system of claim 7, wherein said inflation profile further selects which of said at least two gas generators is triggered after the first time to fire at a second time to fire.

9. The system of claim 8, wherein the second time to fire is defined by the desired inflation profile relative to the first time to fire, whereby the second time to fire is a selected time delay after the first time to fire.

10. The system of claim 9, including means responsive to the received vehicle acceleration information or the received occupant position information for adjusting, after the first time to fire, the selected time delay.

* * * * *